United States Patent [19]

Cluff

[11] Patent Number: 5,234,583
[45] Date of Patent: * Aug. 10, 1993

[54] SEMI-PERMEABLE MEMBRANE FILTERING SYSTEMS FOR SWIMMING POOLS

[76] Inventor: C. Brent Cluff, 310 W. Camino Fairhaven, Tucson, Ariz. 85704

[*] Notice: The portion of the term of this patent subsequent to May 12, 2009 has been disclaimed.

[21] Appl. No.: 736,433

[22] Filed: Jul. 26, 1991

[51] Int. Cl.⁵ .............................................. C02F 9/00
[52] U.S. Cl. .................................. 210/169; 210/223; 210/255; 210/259
[58] Field of Search ............ 210/169, 223, 255, 257.2, 210/258-262, 321.78, 321.87

[56] References Cited

U.S. PATENT DOCUMENTS 4,592,841 6/1986 Ancelle et al. .................. 210/169
5,112,483 5/1992 Cluff .................................. 210/223

Primary Examiner—Ivars Cintins
Attorney, Agent, or Firm—Warren F. B. Lindsley

[57] ABSTRACT

A nanofiltration and/or reverse osmosis system for filtering swimming pool water which system and apparatus eliminates dissolved organic and inorganic matter that is not removed by conventional swimming pool water treatment filtering systems.

7 Claims, 2 Drawing Sheets

SEMI-PERMEABLE MEMBRANE FILTERING SYSTEMS FOR SWIMMING POOLS

BACKGROUND OF THE INVENTION

This invention relates to water treatment techniques and processes and more particularly to a nanofiltration and/or reverse osmosis system for filtering swimming pool water which systems and apparatus eliminate dissolved organic and inorganic matter that is not removed by conventional swimming pool water treatment filtering systems.

DESCRIPTION OF THE PRIOR ART

Nanofiltration and/or reverse osmosis systems comprise the treatment of water by forcing it through a porous membrane. The water molecules are able to pass through the membrane together with some of the smaller organic and inorganic molecules. The larger organic and inorganic molecules are removed by rejection of the nanofilter and/or reverse osmosis filters. The nanofilters will remove most of the dissolved salinity solids and a large percentage of the dissolved organic matter including trihalomethanes (THM) and organic halogens (TOC) precursors and parasites and essentially all of the bacteria and viruses. The naturally occurring organic, humic and fulvic acids in the water will produce THM and TOX compounds (which are suspected carcinogens) when disinfectants such as chlorine or chloramines are added to the water.

The prefix nano means one thousand millionth or $10^{-9}$. One nanometer is equivalent to 10 angstroms. The NF-70 NANOFILTRATION membranes made by FilmTec, a subsidiary of Dow Chemical Company, will reject all molecular species of 10 angstroms or greater in diameter consistent with a 200 molecular weight cutoff. Rejection of molecular species below a 200 molecular weight is dependent on their size, ionic charge and membrane affinity. This molecular weight cutoff is ideal for eliminating organic precursors that are not removed in conventional swimming pool filters and water treatment plants. These nanofilters will remove most of the sulfate, calcium and magnesium products in the water and about ½ of the sodium and chloride compounds. Other companies, including Desal, make a similar type of membrane.

Nanofiltration has a higher molecular cutoff than reverse osmosis. The membrane of the nanofilter is coarser and because of this fact, substantially less energy is required to force water through the membrane of the nanofilter.

The nanofilter system can operate successfully at a pressure of 70 psi and the amount of energy required to operate the filter is about the same as pumping water from a well with a static water level 160 feet below the surface. Higher pressures can be used if necessary to increase the flow and provide even better quality water. The gallons per square foot passing through a unit area of the membrane of the nanofilter can be two to three times that of a reverse osmosis filter. This fact reduces capital costs and the combination of reduced capital cost and reduced energy cost make the nanofilter method less expensive than a reverse osmosis filter and brings the costs down to reasonable levels.

Although the nanofilter can be used on most swimming pools, reverse osmosis filters will be needed for the swimming pools with higher amounts of salinity.

DESCRIPTION OF THE PRIOR ART

A copending application Ser. No. 07/650,291, filed Feb. 4, 1991, now U.S. Pat. No. 5,112,483, and entitled SLOW SAND/NANOFILTRATION WATER TREATMENT SYSTEM by the applicant is the only known prior art. The applicant does not know of any previous case of either nanofiltration or reverse osmosis for treatment of water in swimming pools. This treatment will keep the pool owner from having to periodically drain his pool due to concentration of salts and other impurities from evaporation. Calcium scaling is a potentially serious problem in swimming pools which this process will address.

A very important aspect of the application is the use of the catalytic conditioner, magnetic or sonar conditioner in conjunction with nanofiltration or reverse osmosis for the swimming pool application. Without the conditioners, expensive chemical feed systems would be necessary to prevent calcium scaling particularly if high percentage recoveries were achieved. There is no known prior art of the use of these conditioners with nanofilters and/or reverse osmosis filters in swimming pool applications.

SUMMARY OF THE INVENTION

In accordance with the invention claimed, a new and improved water filtration system for swimming pools is disclosed employing novel nanofiltration or reverse osmosis filter structures.

It is, therefore, one object of this invention to provide a new and improved water filtration system for swimming pools that will allow the pool owner to remove dissolved solids from the water at a reasonable cost.

Another object of this invention is to disclose a new and improved water filtration apparatus for swimming pools employing new nanofiltration and reverse osmosis techniques.

A further object of this invention is to provide a new nanofilter or reverse osmosis filter assembly and method of operation in a sequential arrangement.

A further object is to provide a high percentage of purified water recovery without the use of a chemical feed pump.

Further objects and advantages of this invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
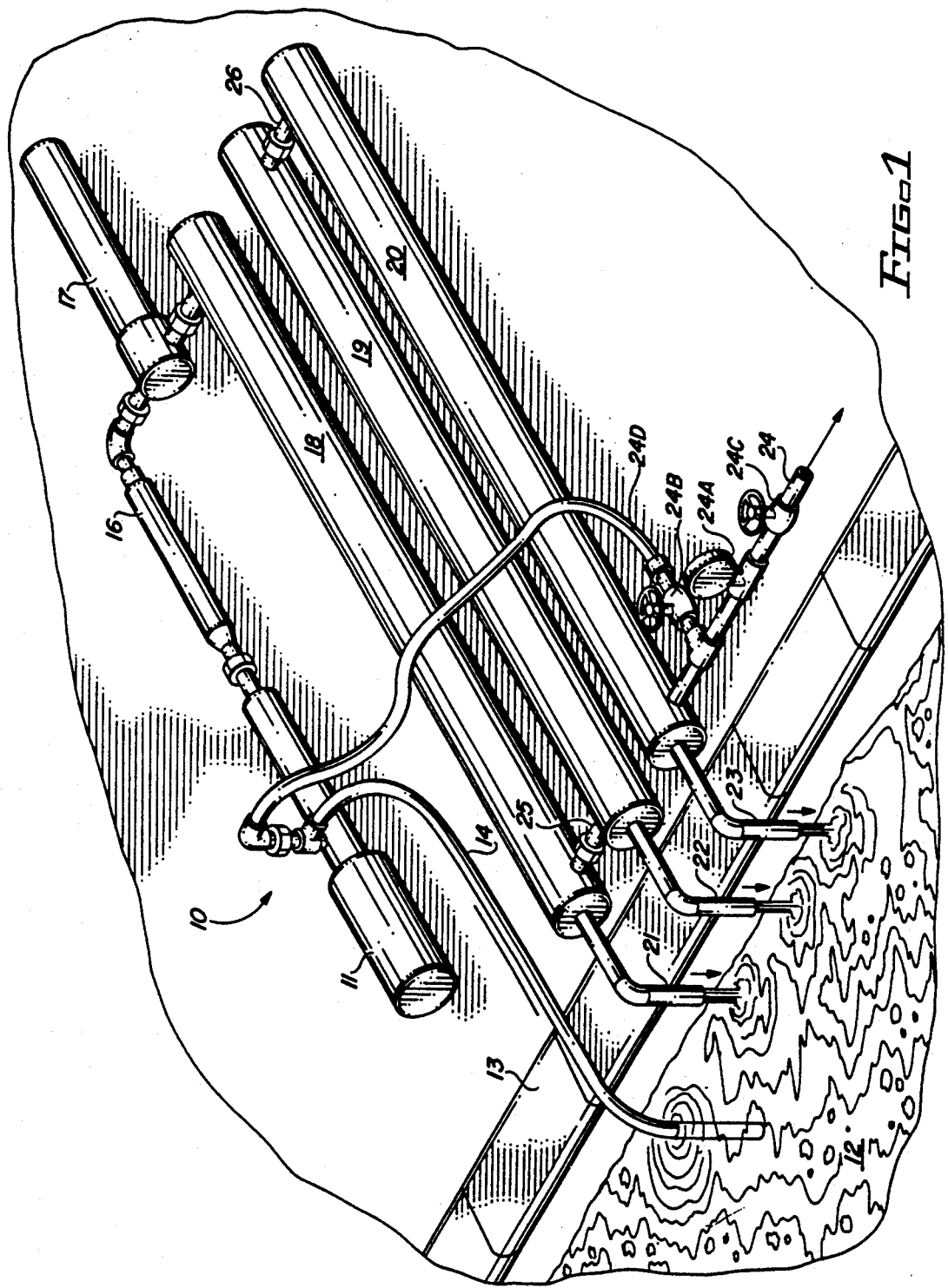
FIG. 1 discloses a diagrammatic illustration of the use of a nanofiltering apparatus for treating the water of a swimming pool and embodying the invention.

Referring more particularly to the drawings by characters of reference, FIG. 1 discloses a diagrammatic illustration of a water filtration system 10 employing a pump 11 for drawing water 12 from a swimming pool 13 through a flexible pipe line 14 into the water filtration system. This system comprises a catalytic, magnetic or sonic conditioner 16 connected in series with a prefilter 17 and a plurality of series connected nanofilters 18, 19 and 20.

As shown in FIG. 1, three nanofilters and/or reverse osmosis filters with the same size filters are shown connected together. However, it is intended to be within the scope of this invention to use any number of like or different size nanofilters having like or different mesh filter elements.

As shown in FIG. 1, water from swimming pool 12 is withdrawn from the pool by pump 11 and transmitted through conditioner 16, prefilter 17 and sequentially through nanofilters or reverse osmosis filters 18, 19 and 20 with part of the purified water from each nanofilter being discharged back into the pool through outlet ports 21, 22 and 23, respectively. The rejected water from the filtration system is discharged through pipe line 24 to a suitable location or sump (not shown).

Water 12 flowing through conditioner 16 and prefilter 17 is connected to one end of filter 18 and conducted through the length of filter 18 where the filtered portion is discharged through outlet port 21 and back into swimming pool 13. The unfiltered portion is transmitted through a coupling 25 to the adjacent end of nanofilter 19 where it filtered along its length with the filtered portion discharged through outlet port 22 into swimming pool 13. The unfiltered portion of the water in nanofilter 19 is transmitted through coupling 26 at the upper end of nanofilter 20, as shown in FIG. 1, with the filtered portion of the filtered water being discharged through line 24 to a sump or the like.

As noted, FIG. 1 illustrates a series arrangement of a plurality of the same size filters 18, 19 and 20 which receive water 12 from prefilter 17. This water is transmitted through the series arrangement of the filters with a portion from each filter being filtered off as purified water. An important feature of this invention is that nanofilter elements having increasing salt rejection function may be used. As the reject water increases in salt concentration tighter membranes that have a higher salt rejection capability are used. The Desal company's SH product has a higher salt rejection feature than the Desal DK product. Similarly, the Desal product SG has an even higher salt rejection than its SH product.

The volume of water 12 flowing through a series connection of filters drops in pressure and volume through each of the filters finally discharging through pipeline 24 to a reject site or sump (not shown). A pressure gauge 24A registers the pressure which is controlled by adjusting valves 24B and 24C.

A hose 24D returns part of the reject water back through the filter system to maintain appropriate flow velocity to reduce fouling.

Decreasing sizes of the nanofilters and/or reverse osmosis filters may also be used as the flow of water through the filters diminishes due to removal of filtered water to maintain appropriate flow velocity.

Figure 2:
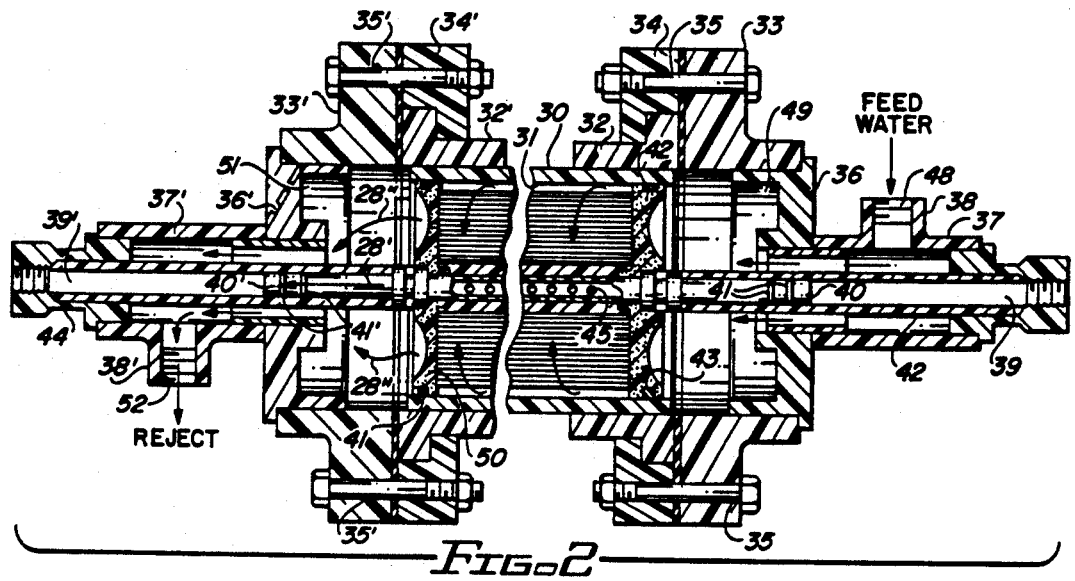
FIG. 2 is a cross sectional view of a particular nanofilter.

FIG. 2 is a cutaway view of a typical nanofilter comprising a housing 30 enclosing a cartridge 31. Although these filters are manufactured in various sizes, as heretofore explained, FIG. 2 is typical of one design configuration.

Housing 30 comprises a cylindrical configuration that encloses a nanofilter or reverse osmosis filter cartridge 31 and is provided at each end with annular ring forming flanges 32, 32'. To these flanges are secured collars 33, 33' held there against by inboard rings 34, 34' and bolts 35, 35', as shown. The ends of the filter structure are provided with apertured flange 36, 36', sealed thereon for receiving axially thereof T-shaped connectors or couplings 37, 37', the internally threaded T-outlets 38, 38' of which form water inlets and water outlets, respectively.

Except for cartridge 31, all of the parts forming the nanofilter comprise plastic pipe fittings and couplings found in the marketplace. The only machining that is needed on standard fittings is to cut the seating ring out of bushings 37 and 37' so that pipe 39 and 39' can pass completely through these bushings. The other machining needed is to slightly enlarge standard pipes 39 and 39' so that a standard insert 40, 40' equipped with O-rings 41, 41' can slip inside to seal the product water from the brine water. Although the pipe fittings and other parts are defined as being fromed of plastic materials found in the marketplace, other materials including fiberglass in specially built encapsulated parts may be used.

Figure 3:
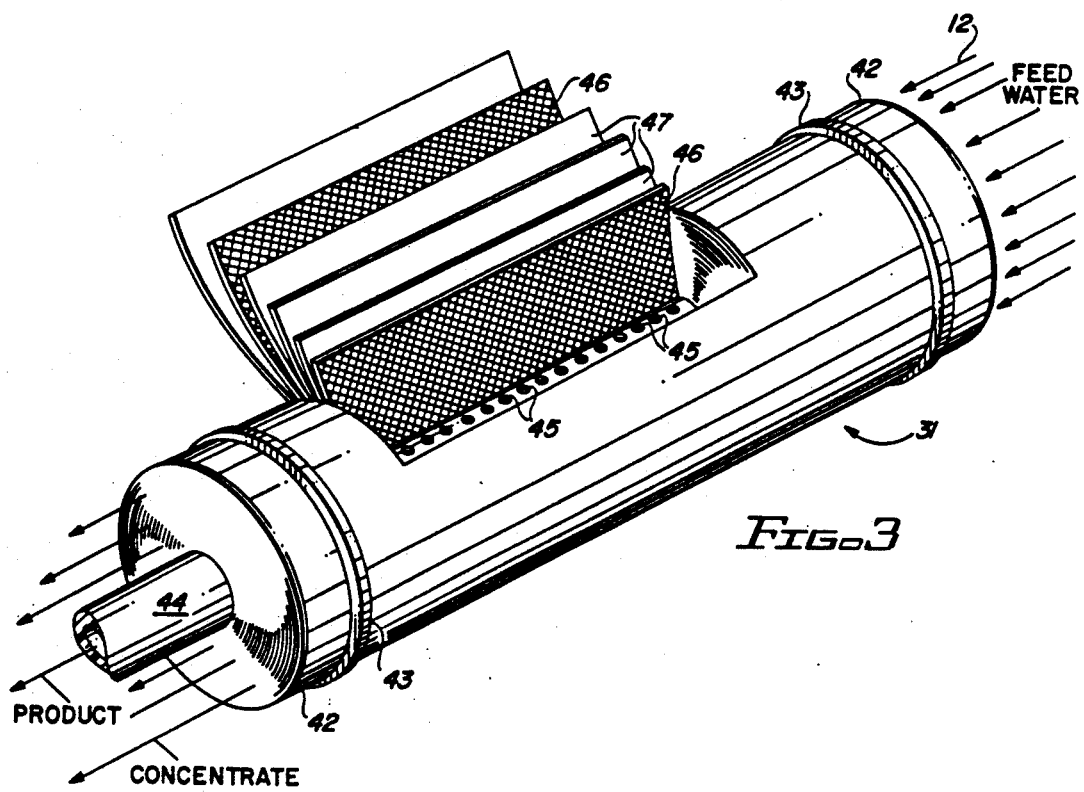
FIG. 3 is a perspective view of a nanofilter with a cutaway and exploded view of the various wrappings of the filter.

FIG. 3 discloses a cutaway view of the internal characteristics of cartridge 31 with radial view of its elements. As shown, each end of cartridge 31 is provided with a combination cap and annular filters 42 the outer diameter of which is sealed in the inner diameter of housing 30 by O-rings 43 formed at the entrance and exit ends of cartridge 31. Cartridge 31 comprises a pipe 44 comprising a plurality of parts extending axially therethrough the inner portion of which is provided with a plurality of apertures 45 axially positioned as shown, to provide passageways for receiving water flowing inwardly through the various spirally positioned membrane elements 46 and spacers 47.

As mentioned heretofore, the nanofilters and reverse osmosis elements are manufactured and sold in the marketplace by FilmTec, a subsidiary of Dow Chemical Company as well as other companies and per se do not form a part of this invention. This invention is directed to the nanofilter or reverse osmosis filter in an assembly formed to filter swimming pool water continually or in a periodic mode.

With reference to FIG. 2, water is directed through water feed inlet 48 into a manifold 49 where it is fed under pressure through a porous end cap or annular filter 42 and along the outer periphery of cartridge 31 and through the various spacers 47 and membrane elements 46 thereof. This water percolates through the various membrane elements forming the cartridge until a part of the water filters into the apertured pipe 45 and is transmitted under pressure to an outlet 39 for use as purified water 28'. The portion of the water 28" that is screened out by the various membrane elements 46 is fed into manifold 51 and through the outlet 52 formed by T-shaped coupling 37' and suitably disposed of.

Accordingly, it will be apparent to those skilled in the art that various changes and modifications may be made therein without departing from the spirit of the invention or from the scope of the appended claims.

Although the swimming pool unit is depicted as a portable unit, the unit could be permanently installed to be available for use when needed.

What is claimed is:

1. A water filtration system for swimming pools comprising:
   a cylindrical semi-permeable membrane member formed of a plurality of coaxial layers of membrane elements separated by spacer elements and having a cylindrical opening extending axially therethrough, said semi-permeable membrane comprises a nanofilter, an elongated housing surrounding said member in spaced relationship thereto, a pair of axially aligned caps one attached to each end of said housing, each of said caps having an aperture extending therethrough and defining between a cap and a different end of said housing first and second manifolds, respectively, a pair of pipe fittings fastened one to each of said caps and extending outwardly thereof for providing a water inlet port and a water outlet port respectively, a pipe extending axially through said pipe fittings, said caps and said member and being provided with a plurality of apertures spacedly arranged along the length of the portion of said pipe within said member, each of said pipe fittings being spacedly arranged one sealed to each end of said pipe and forming a passageway around and along said pipe, pump means for drawing water from a swimming pool and transmitting it into said inlet port for flowing into one end of said manifold and then axially of and laterally inwardly through said member with a purified portion of said water flowing through said apertures and into said pipe and outwardly of one end thereof through said water outlet port and into the pool and a reject portion of said water flowing out of the member longitudinally thereof through the outer of said pipe fittings for discharge thereof and a water conditioner connected between said pump and said housing comprising a catalytic device.

2. The water filtration system set forth in claim 1 wherein:
said member comprises a reverse osmosis filter.

3. A water filtration system for swimming pools comprising:

at least a pair of cylindrically formed members each formed of a plurality of layers of semi-permeable membrane elements separated by spacer elements and having a cylindrical opening extending axially therethrough, said semi-permeable membrane elements comprise a nanofilter, a pair of elongated housings one surrounding each of said members in spaced relationship thereto, a pair of axially aligned caps one of each pair being attached to each end of each of said housings, each of the caps having an aperture extending therethrough and defining between said cap and an associated end of one of said housings a manifold, a pair of pipe fittings fastened one to each of said caps and extending outwardly and axially thereof for providing a water inlet port and a water outlet port respectively, for each housing, a pipe extending axially through said pipe fittings, said caps and each of said members and being provided with a plurality of apertures spacedly arranged along the length of the portion of said pipe within each of said members, each of said pipe fittings being spacedly arranged one to each end of the associated pipe and sealed thereto at its outer ends for forming a passageway around the associated pipe axially thereof, and pump means for drawing water from a swimming pool and connected to said water inlet port of one of said pipe fittings to cause the water to flow into a first one of the manifolds and then axially of and laterally inwardly through said one of said members with a purified portion of said water flowing through the apertures of the pipe in said one of said manifolds and into said pipe and outwardly of one end thereof through said water outlet port and into the pool and a reject portion of the water flowing out of said one of said members longitudinally thereof and into said water inlet port of a second manifold and then axially of and laterally inwardly through the second member with a purified portion of said water flowing through the apertures of the pipe in said second of said members and into the associated pipe and outwardly of one end thereof through its water outlet port and into the pool and a rejected portion of the water flowing out of said second of said filters longitudinally thereof and the other of said pipe fittings for discharge purposes, and a water conditioner connected between said pump and said first of said housings and comprising a catalytic device.

4. The water filtration system set forth in claim 3 wherein:
said semi-permeable membrane elements comprise a reverse osmosis filter.

5. The water filtration system set forth in claim 3 wherein:
said members are arranged in a cascading sequence wherein one or more of the subsequent said members has a higher salt rejection capability.

6. A water filtration system for swimming pools comprising:

a cylindrical semi-permeable membrane member formed of a plurality of coaxial layers of membrane elements separated by spacer elements and having a cylindrical opening extending axially therethrough, said semi-permeable membrane comprises a nanofilter, an elongated housing surrounding said member in spaced relationship thereto, a pair of axially aligned caps one attached to each end of said housing, each of said caps having an aperture extending therethrough and defining between a cap and a different end of said housing first and second manifolds, respectively, a pair of pipe fittings fastened one to each of said caps and extending outwardly thereof for providing a water inlet port and a water outlet port respectively, a pipe extending axially through said pipe fittings, said caps and said member and being provided with a plurality of apertures spacedly arranged along the length of the portion of said pipe within said member, each of said pipe fittings being spacedly arranged one sealed to each end of said pipe and forming a passageway around and along said pipe, pump means for drawing water from a swimming pool and transmitting it into said inlet port for flowing into one end of said manifold and then axially of and laterally inwardly through said member with a purified portion of said water flowing through said apertures and into said pipe and outwardly of one end thereof through said water outlet port and into the pool and a reject portion of said water flowing out of the member longitudinally thereof through the other of said pipe fittings for discharge thereof, and a water conditioner connected between said pump and said housing comprising a magnetic device.

7. A water filtration system for swimming pools comprising:

at least a pair of cylindrically formed members each formed of a plurality of layers of semi-permeable membrane elements separated by spacer elements and having a cylindrical opening extending axially therethrough, said semi-permeable membrane elements comprise a nanofilter, a pair of elongated housings one surrounding each of said members in spaced relationship thereto, a pair of axially aligned caps one of each pair being attached to each end of each of said housings, each of the caps having an aperture extending therethrough and defining between said cap and an associated end of one of said housings a manifold, a pair of pipe fittings fastened one to each of said caps and extending outwardly and axially thereof for providing a water inlet port and a water outlet port respectively, for each housing, a pipe extending axially through said pipe fittings, said caps and each of said members and being provided with a plurality of apertures spacedly arranged along the length of the portion of said pipe within each of said members, each of said pipe fittings being spacedly arranged one to each end of the associated pipe and sealed thereto at its outer ends for forming a passageway around the associated pipe axially thereof, and pump means for drawing water from a swimming pool and connected to said water inlet port of one of said pipe fittings to cause the water to flow into a first one of the manifolds and then axially of and laterally inwardly through said one of said members with a purified portion of said water flowing through the apertures of the pipe in said one of said manifolds and into said pipe and outwardly of one end thereof through said water outlet port and into the pool and a reject portion of the water flowing out of said one of said members longitudinally thereof and into said water inlet port of a second manifold and then axially of and laterally inwardly through the second member with a purified portion of said water flowing through the apertures of the pipe in said second of said members and into the associated pipe and outwardly of one end thereof through its water outlet port and into the pool and a rejected portion of the water flowing out of said second of said filters longitudinally thereof and the other of said pipe fittings for discharge purposes, and a water conditioner connected between said pump and said first of said housings and comprising a magnetic device.

* * * * *

UNITED STATES PATENT AND TRADEMARK OFFICE
CERTIFICATE OF CORRECTION

PATENT NO. : 5,234,583
DATED : August 10, 1993
INVENTOR(S) : C. Brent Cluff

It is certified that error appears in the above-identified patent and that said Letters Patent is hereby corrected as shown below:

Claim 1, line 8 after "membrane" insert ---member---.

Claim 1, line 35 cancel "outer" and substitute ---other---.

Claim 6, line 8 after "membrane" insert ---member---.

Signed and Sealed this

Twenty-ninth Day of March, 1994

Attest:

BRUCE LEHMAN

Attesting Officer     Commissioner of Patents and Trademarks